(12) United States Patent
Iguchi

(10) Patent No.: US 11,396,481 B2
(45) Date of Patent: Jul. 26, 2022

(54) DIELECTRIC COMPOSITION AND ELECTRONIC COMPONENT

(71) Applicant: TDK CORPORATION, Tokyo (JP)

(72) Inventor: Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/944,301

(22) Filed: Jul. 31, 2020

(65) Prior Publication Data
US 2021/0061718 A1 Mar. 4, 2021

(30) Foreign Application Priority Data
Aug. 27, 2019 (JP) .............................. JP2019-154785

(51) Int. Cl.
| | |
|---|---|
| *C04B 35/495* | (2006.01) |
| *H01G 11/46* | (2013.01) |
| *C04B 35/50* | (2006.01) |
| *H01G 11/30* | (2013.01) |
| *H01G 11/28* | (2013.01) |
| *C04B 111/90* | (2006.01) |

(52) U.S. Cl.
CPC .............. *C04B 35/50* (2013.01); *H01G 11/30* (2013.01); *C04B 2111/90* (2013.01); *C04B 2235/3217* (2013.01); *C04B 2235/3224* (2013.01); *C04B 2235/3418* (2013.01); *H01G 11/28* (2013.01)

(58) Field of Classification Search
CPC ................................................... C04B 35/495
See application file for complete search history.

(56) References Cited

U.S. PATENT DOCUMENTS

| | | | |
|---|---|---|---|
| 6,403,053 B1 * | 6/2002 | Fang | C04B 35/495 423/594.8 |
| 2021/0065979 A1 * | 3/2021 | Iguchi | H01G 4/1227 |

OTHER PUBLICATIONS

Nishiwaki et. al.; "The Effect of V2O5 Addition on the Ferroelectric Properties of Sr0.3Ba0.7Nb2O6 Ceramics;" Journal of the Ceramic Society of Japan; 1995; vol. 103, No. 12; pp. 1246-1250.

* cited by examiner

*Primary Examiner* — Karl E Group
(74) *Attorney, Agent, or Firm* — Oliff PLC

(57) ABSTRACT

Provided is a dielectric composition exhibiting a high strength and a high specific dielectric constant. The dielectric composition contains composite oxide particles having a composition formula represented by $(Sr_xBa_{1-x})_yNb_2O_{5+y}$ and an Al-based segregation phase. The Al segregation phase has niobium, aluminum, and oxygen.

11 Claims, 4 Drawing Sheets

DIELECTRIC COMPOSITION AND ELECTRONIC COMPONENT

BACKGROUND OF THE INVENTION

Field of the Invention

The present invention relates to a dielectric composition and an electronic component including a dielectric layer composed of the dielectric composition.

Description of the Related Art

In an electronic circuit or a power supply circuit incorporated in electronic equipment, many electronic components such as multilayer ceramic capacitors that utilize the dielectric characteristics expressed by a dielectric are mounted. In Non-Patent Literature 1 (NISHIWAKI Shiro, TAKAHASHI Junichi, and KODAIRA Kohei, "addition effect of $V_2O_5$ on the ferroelectricity of $Sr_{0.3}Ba_{0.7}Nb_2O_6$ ceramics", Journal of the Ceramic Society of Japan, 103 [12], 1995, 1246-1250), a ferroelectric material represented by a general formula of $Sr_xBa_{1-x}Nb_2O_6$ is disclosed as a material (dielectric material) that constitutes the dielectric of the above electronic component.

In Non-Patent Literature 1, by adding $V_2O_5$ to $Sr_{0.3}Ba_{0.7}Nb_2O_6$, the oxide is sintered to a higher density at a low temperature under atmospheric pressure compared with a case of not adding $V_2O_5$.

However, the inventor has found that it is difficult to improve the density when the above oxide is sintered in a reducing atmosphere.

SUMMARY OF THE INVENTION

The present invention has been made in view of the above circumstances, and an objective thereof is to provide a dielectric composition exhibiting a high strength and a high specific dielectric constant, and an electronic component including a dielectric layer composed of the dielectric composition.

In order to achieve the above objective, the dielectric composition according to the first aspect of the present invention contains composite oxide particles having a composition formula represented by $(Sr_xBa_{1-x})_yNb_2O_{5+y}$, and an Al-based segregation phase, and the Al-based segregation phase contains an Al-based oxide having niobium, aluminum and oxygen.

The inventor has found that the dielectric composition according to the first aspect of the present invention can exhibit a high strength and a high specific dielectric constant by having the above configuration. The reason why this effect is obtained is considered to be that the Al-based oxide functions as a good sintering aid for the above composite oxide particles.

In the Al-based oxide of the dielectric composition according to the first aspect of the present invention, the mole ratio of aluminum (Al) represented by a formula of Al/(Al+Nb) may be 0.43 to 0.69.

Thereby, the dielectric composition according to the first aspect of the present invention can exhibit a higher strength and a higher specific dielectric constant.

In the dielectric composition according to the first aspect of the present invention, the crystal system of the Al-based oxide may be monoclinic.

Thereby, the dielectric composition according to the first aspect of the present invention can exhibit a higher strength and a higher specific dielectric constant.

In the dielectric composition according to the first aspect of the present invention, the area ratio of the Al-based segregation phase represented by a formula of (area of Al-based segregation phase/area of composite oxide particles)×100 [%] may be 0.1% to 10%.

Thereby, the dielectric composition according to the first aspect of the present invention can exhibit a higher strength and a higher specific dielectric constant.

In order to achieve the above objective, the dielectric composition according to the second aspect of the present invention contains composite oxide particles having a composition formula represented by $(Sr_xBa_{1-x})_yNb_2O_{5+y}$, and a Si-based segregation phase, and the Si-based segregation phase contains a Si-based oxide having niobium, alkaline earth metal, and silicon.

The inventor has found that the dielectric composition according to the second aspect of the present invention can exhibit a high strength and a high specific dielectric constant by having the above configuration. The reason why the above effect is obtained is considered to be that the Si-based oxide functions as a good sintering aid for the above composite oxide particles.

In the Si-based oxide of the dielectric composition according to the second aspect of the present invention, when the amount of niobium is set as 6 parts by mole, the amount of silicon may be 2.4 to 4 parts by mole, and the amount of alkaline earth metal may be 1.8 to 6 parts by mole.

Thereby, the dielectric composition according to the second aspect of the present invention can exhibit a higher strength and a higher specific dielectric constant.

In the dielectric composition according to the second aspect of the present invention, the aspect ratio in the cross-section of the Si-based segregation phase may be 2.0 or more.

Thereby, the dielectric composition according to the second aspect of the present invention can exhibit a higher strength and a higher specific dielectric constant.

In the dielectric composition according to the second aspect of the present invention, the crystal system of the Si-based oxide may be hexagonal.

Thereby, the dielectric composition according to the second aspect of the present invention can exhibit a higher strength and a higher specific dielectric constant.

In the dielectric composition according to the second aspect of the present invention, the area ratio of the Si-based segregation phase represented by a formula of (area of Si-based segregation phase/area of composite oxide particles)×100 [%] may be 0.1% to 10%.

Thereby, the dielectric composition according to the second aspect of the present invention can exhibit a higher strength and a higher specific dielectric constant.

The electronic component of the present invention includes a dielectric layer containing the dielectric composition according to the first aspect or the dielectric composition according to the second aspect.

Thereby, the electronic component of the present invention can exhibit a high strength and a high specific dielectric constant.

DETAILED DESCRIPTION OF THE PREFERRED EMBODIMENTS

1. First Embodiment (1.1. Multilayer Ceramic Capacitor)

(1.1.1 Overall Configuration of Multilayer Ceramic Capacitor)

Figure 1:
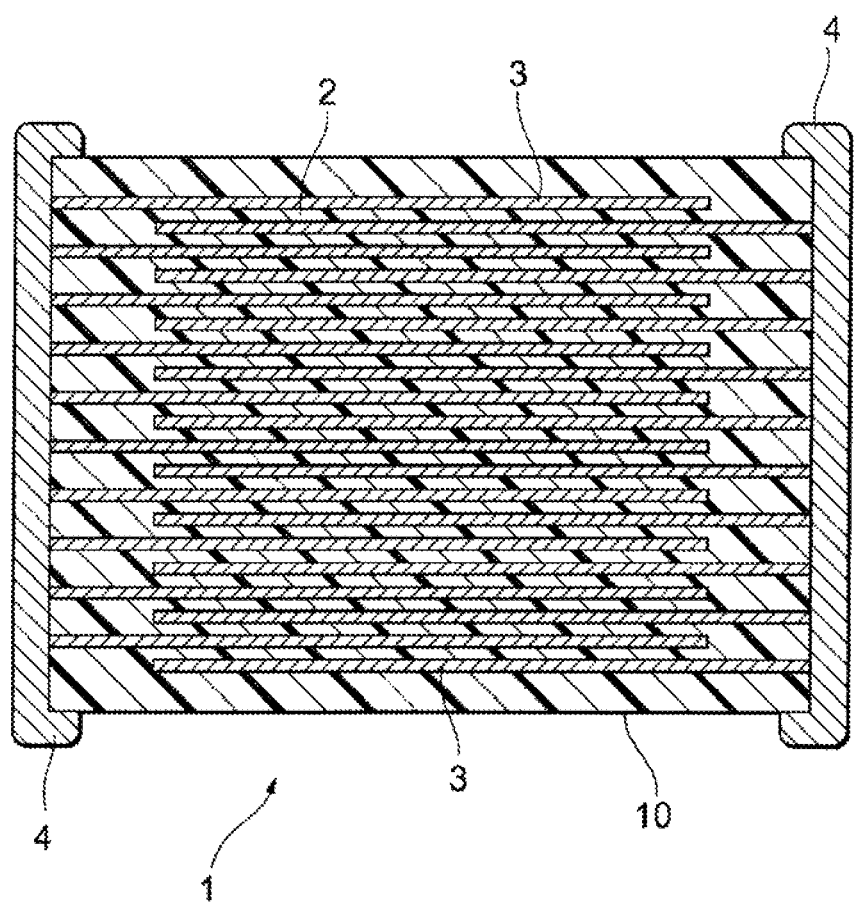
FIG. 1 is a cross-sectional view of a multilayer ceramic capacitor according to an embodiment of the present invention.

FIG. 1 shows a multilayer ceramic capacitor 1 as an example of an electronic component according to this embodiment. The multilayer ceramic capacitor 1 has an element body 10 configured so that dielectric layers 2 and internal electrode layers 3 are alternately stacked. At both ends of the element body 10, a pair of external electrodes 4 conductive with each of the internal electrode layers 3 alternately disposed inside the element body 10 is formed. The shape of the element body 10 is not particularly limited and is usually a rectangular parallelepiped. In addition, the size of the element body 10 is not particularly limited and may be an appropriate size according to the application.

(1.1.2 Dielectric Layer)

The dielectric layer 2 is composed of a dielectric composition (described later) according to the embodiment.

The thickness of each layer (interlayer thickness) of the dielectric layers 2 is not particularly limited and can be set arbitrarily according to the desired characteristic, application, or the like. Usually, the interlayer thickness is preferably 30 μm or less, more preferably 20 μm or less, and further preferably 10 μm or less. In addition, the stacked number of the dielectric layers 2 is not particularly limited and is preferably, for example, 20 or more in the embodiment.

(1.1.3 Internal Electrode Layer)

In the embodiment, the internal electrode layers 3 are stacked so that the ends are alternately exposed on the surfaces of two end faces of the element body 10 facing each other.

The conductive material contained in the internal electrode layer 3 is not particularly limited. Examples of noble metal used as the conductive material include Pd, Pt, Ag—Pd alloys, and the like. Examples of base metal used as the conductive material include Ni, Ni-based alloys, Cu, Cu-based alloys, and the like. Besides, in Ni, Ni-based alloys, Cu, or Cu-based alloys, various trace components such as P and/or S may be contained in an amount of about 0.1% by mass or less. In addition, the internal electrode layer 3 may be formed using a commercially available electrode paste. The thickness of the internal electrode layer 3 may be appropriately determined according to the application and the like.

(1.1.4 External Electrode)

The conductive material contained in the external electrode 4 is not particularly limited. For example, a known conductive material such as Ni, Cu, Sn, Ag, Pd, Pt, Au, alloys thereof, or a conductive resin may be used. The thickness of the external electrode 4 may be appropriately determined according to the application and the like.

(1.2. Dielectric Composition)

Figure 2:
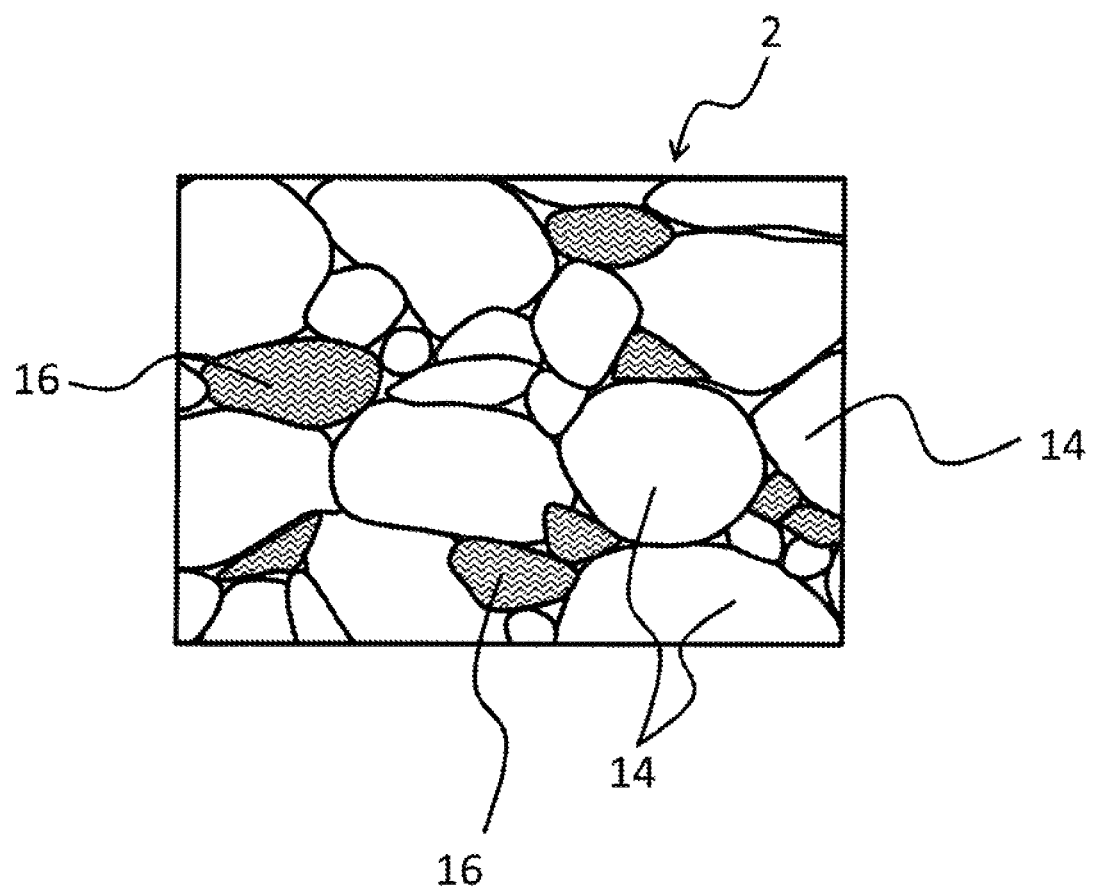
FIG. 2 is a cross-sectional view of a dielectric composition of Sample No. 3.

As shown in FIG. 2, the dielectric composition constituting the dielectric layer 2 according to the embodiment contains an Al-based segregation phase 16 among composite oxide particles 14 having a composition formula represented by $(Sr_xBa_{1-x})_yNb_2O_{5+y}$. The dielectric composition according to the embodiment may contain an element such as Cu, Zn, Pd, Ta or Sn if necessary.

(1.2.1 Composite Oxide Particle)

The composite oxide particles 14 of the embodiment have a composition formula represented by $(Sr_xBa_{1-x})_yNb_2O_{5+y}$, and the ranges of x and y in the above composition formula are not particularly limited.

In the embodiment, the upper limit of y in the composition formula is preferably 1.2 or less, more preferably smaller than 1, and further preferably 0.95 or less. In addition, the lower limit of y in the composition formula is preferably 0.8 or more.

By y in the composition formula being smaller than 1, it is possible to exhibit a high specific dielectric constant and a high resistivity even after reduction firing.

The inventor has found that by y in the composition formula being smaller than 1, the dielectric composition of the embodiment can exhibit a high resistivity even when fired in a reducing atmosphere. That is, in a reducing atmosphere, the multilayer ceramic capacitor 1 obtained by firing the dielectric composition containing the composite oxide particles 14 at the same time of firing an electrode composed of base metal can exhibit a high specific dielectric constant and a high resistivity.

The reason why a high resistivity can be exhibited even when the dielectric composition according to the embodiment is fired in a reducing atmosphere can be estimated as follows for example.

When an oxide represented by a general formula of $(Sr_xBa_{1-x})_1Nb_2O_6$ is fired in a reducing atmosphere, oxygen is deprived from the oxide, and oxygen defects and free electrons are generated in pairs. As a result, it is considered that the conductivity obtained by the motion of the generated free electrons is generated and the resistivity of the oxide is reduced.

In contrast, by y in the composition formula of the composite oxide particles 14 being smaller than 1, a cation defect state and an oxygen defect state are formed. As a result, because the oxygen defects are present to some extent in the composite oxide particles 14, the reaction generating oxygen defects and free electrons accompanying reduction firing is not prone to proceed. That is, even in a reducing atmosphere, the reaction in which oxygen is deprived from the composite oxide particles 14 and free electrons are generated is not prone to occur. Accordingly, it is considered that free electrons are not prone to generate and thus the reduction in resistivity is suppressed.

In addition, the crystal system of the composite oxide particles 14 of the embodiment is preferably tetragonal. Thereby, it is considered that a high specific dielectric constant can be exhibited.

When the composite oxide has the composition formula represented by $(Sr_xBa_{1-x})_yNb_2O_{5+y}$ and the crystal structure is tetragonal, compared with the case in which the crystal structure is cubic, orthorhombic, hexagonal, or monoclinic, the range of displacement of $Nb^{5+}$ ions in the crystal becomes larger and thus polarization becomes easier when an electric field is applied. Therefore, it is considered that the specific dielectric constant tends to be higher in the case that the crystal system of the composite oxide particles 14 is tetragonal than in the case that the crystal system is cubic, orthorhombic, hexagonal, or monoclinic.

In addition, the space group of the composite oxide particles 14 of the embodiment is preferably P4bm. Thereby, it is possible to exhibit a high specific dielectric constant and a high resistivity. The reason is considered to be that the range of displacement of $Nb^{5+}$ ions in the crystal becomes larger.

In the embodiment, x in the composition formula is preferably 0.2 to 0.7. By containing x in the composition formula within the above range, it is possible to exhibit a high specific dielectric constant and a high resistivity. In addition, by containing x in the composition formula within the above range, the composite oxide particles 14 having a tetragonal crystal system are easily obtained, and the specific dielectric constant tends to be improved. In the embodiment, x in the composition formula is more preferably 0.2 to 0.6, and further preferably 0.2 to 0.5.

(1.2.2 Al-Based Segregation Phase)

As shown in FIG. 2, the dielectric composition that constitutes the dielectric layer 2 according to the embodiment contains the Al-based segregation phase 16 among the composite oxide particles 14. The Al-based segregation phase 16 contains an Al-based oxide having niobium (Nb), aluminum (Al), and oxygen (O). Besides, the Al-based segregation phase 16 may contain an element in addition to the above elements.

The dielectric composition according to the embodiment can exhibit a high strength and a high specific dielectric constant by containing the Al-based segregation phase 16 among the composite oxide particles 14. The reason why this effect is obtained is considered to be that the Al-based oxide functions as a good sintering aid for the composite oxide particles 14.

In addition, there is a tendency that the specific dielectric constant is required to be high near room temperature, and the dielectric composition according to the embodiment can improve the specific dielectric constant near room temperature.

In the embodiment, a method for judging whether the dielectric composition constituting the dielectric layer 2 contains the Al-based segregation phase 16 among the composite oxide particles 14 is not particularly limited, and a specific method is illustrated below.

First, a scanning transmission electron microscope (STEM) is used to photograph the cross-section of the dielectric composition, and a bright-field (BF) image is obtained. The width of the field to be photographed is not particularly limited and is, for example, about 1-10 μm square. In this bright-field image, a region having a contrast different from that of the composite oxide particles 14 is identified as a different phase. Whether there is a different contrast, that is, whether there is a different phase may be judged visually or by software or the like that performs image processing.

Then, for the different phase, each amount of aluminum (Al), strontium (Sr), barium (Ba), and niobium (Nb) is measured by EDS analysis.

In the embodiment, preferably, when the total amount of aluminum (Al), strontium (Sr), barium (Ba), and niobium (Nb) is set as 100 parts by mole, an Al-based oxide is formed at a location where aluminum (Al) is 40 to 69 parts by mole and niobium (Nb) is 29 to 57 parts by mole, and this location is judged as the Al-based segregation phase 16.

Besides, in the embodiment, preferably, when the total amount of aluminum (Al), strontium (Sr), barium (Ba), and niobium (Nb) is set as 100 parts by mole, an Al-based oxide is formed at a location where aluminum (Al) is 40 to 50 parts by mole and niobium (Nb) is 29 to 50 parts by mole, and this location is judged as the Al-based segregation phase 16.

In addition, the presence or absence of the Al-based segregation phase 16 may be judged according to a mapping image. Specifically, the mapping image of aluminum (Al) and the mapping image of niobium (Nb) are compared to specify a location at which aluminum (Al) and niobium (Nb) are present at the same position. Then, the mole ratio of aluminum (Al) and the mole ratio of niobium (Nb) at the specified location are measured, and when the mole ratios are within the above range, it may be judged that an Al-based oxide is formed at that location and the location is the Al segregation phase 16.

In the embodiment, the area ratio of the Al-based segregation phase 16 is represented by a formula of "(area of Al-based segregation phase 16/area of composite oxide particles 14)×100 [%]".

In the embodiment, the area ratio of the Al-based segregation phase 16 is preferably 0.1% to 10%, and more preferably 1% to 10%. Thereby, the dielectric composition of the embodiment can exhibit a higher strength and a higher specific dielectric constant.

In the embodiment, the circle equivalent diameter ratio of the Al-based segregation phase 16 is represented by a formula of "(circle equivalent diameter of Al-based segregation phase 16/circle equivalent diameter of composite oxide particles 14)×100 [%]". Besides, the circle equivalent diameter indicates the diameter of a circle having the same area as the area of this shape.

In the embodiment, the circle equivalent diameter ratio of the Al-based segregation phase 16 is preferably 0.1% to 10%, and more preferably 0.2%-5%. Thereby, the dielectric composition of the embodiment can exhibit a higher strength and a higher specific dielectric constant.

In the embodiment, the crystal system of the Al-based oxide is preferably monoclinic. Thereby, the dielectric composition of the embodiment can exhibit a higher strength and a higher specific dielectric constant.

In the Al-based oxide in the embodiment, the mole ratio of aluminum (Al) represented by a formula of "Al/(Al+Nb)" is preferably 0.43 to 0.69, more preferably 0.43 to 0.50.

By the mole ratio of aluminum (Al) in the Al-based oxide being within the above range, the dielectric composition according to the embodiment can exhibit a higher strength and a higher specific dielectric constant.

The Al-based oxide in the embodiment is represented by a chemical formula of $(Nb_{(8-3a)/5}Al_a)O_4$, and "a" in the chemical formula is preferably 0.83 to 1.52, more preferably 0.83 to 1.00. Thereby, the dielectric composition according to the embodiment can exhibit a higher strength and a higher specific dielectric constant.

(1.3. Manufacturing Method for Multilayer Ceramic Capacitor)

Next, an example of a manufacturing method for the multilayer ceramic capacitor 1 shown in FIG. 1 is described below.

First, a starting raw material of the dielectric composition is prepared. As the starting raw material, the composite oxide particles 14 constituting the dielectric composition can be used. In addition, oxides of the metals contained in the composite oxide particles 14 can be used. In addition, various compounds which become components constituting the composite oxide particles 14 by firing can be used. Examples of the various compounds include carbonates, oxalates, nitrates, hydroxides, organometallic compounds and the like. In the embodiment, the starting raw material is preferably powder.

In the embodiment, a raw material of the Al-based oxide is prepared in addition to the starting raw material. Specifically, various compounds such as niobium (Nb) and aluminum (Al) oxides and the like are prepared. In the embodiment, it is preferable that the raw material of each component constituting the Al-based oxide is heat-treated to obtain calcined powder of the Al-based oxide.

The raw material of the composite oxide particles 14 among the prepared starting raw materials is weighed at a predetermined proportion, and then wet-mixed for a predetermined time using a ball mill or the like. The mixed powder is dried and then heat-treated at 700° C. to 1300° C. in the atmosphere, and calcined powder of the composite oxide particles 14 is obtained. In addition, the calcined powder may be pulverized for a predetermined time using a ball mill or the like.

Subsequently, a paste for producing a green chip is prepared. The obtained calcined powder of the composite oxide particles 14, the raw material powder of the Al-based oxide or the calcined powder of the Al-based oxide, a binder, and a solvent are kneaded into slurry to prepare a paste for dielectric layer. A known binder and solvent may be used.

The paste for dielectric layer may contain additives such as a plasticizer or a dispersant if necessary.

A paste for internal electrode layer is obtained by kneading the raw material of the conductive material, a binder, and a solvent. A known binder and solvent may be used. The paste for internal electrode layer may contain additives such as an inhibitor or a plasticizer if necessary.

A paste for external electrode can be prepared in the same manner as the paste for internal electrode layer.

The obtained pastes are used to form a green sheet and an internal electrode pattern, and the green sheet and the internal electrode pattern are stacked to obtain a green chip.

The obtained green chip is subjected to binder removal treatment if necessary. As a condition of the binder removal treatment, for example, the retention temperature is preferably set at 200° C. to 350° C.

After the binder removal treatment, the green chip is fired, and the element body 10 is obtained. In the embodiment, firing under a reducing atmosphere (reduction firing) can be performed. In the embodiment, the retention temperature during firing is preferably set at 1200° C. to 1350° C. Even if the retention temperature during firing is set relatively low in this manner, the dielectric composition of the embodiment is easily obtained. In addition, when the green chip containing the composite oxide particles 14 of the embodiment is fired, it is possible to prevent the green chip from reacting with a setter or the like by firing at the lowest possible temperature.

After the firing, the obtained element body 10 is subjected to reoxidation treatment (annealing) if necessary. As the annealing conditions, for example, the oxygen partial pressure during annealing is preferably set higher than the oxygen partial pressure during firing, and the retention temperature is preferably set at 1150° C. or lower.

The dielectric composition constituting the dielectric layer 2 of the element body 10 obtained as described above is the above dielectric composition. The element body 10 is subjected to end face polishing, the paste for external electrode is applied and baked, and the external electrode 4 is formed. Then, if necessary, a coating layer is formed on the surface of the external electrode 4 by plating or the like.

In this manner, the multilayer ceramic capacitor 1 according to the embodiment is manufactured.

In the embodiment, it is considered that the sintering of the dielectric composition is promoted during firing by containing the Al-based oxide or the raw material of the Al-based oxide in the raw material of the dielectric composition. Accordingly, it is possible to reduce the firing temperature necessary for obtaining the sinterability to the extent that sufficient characteristics can be exhibited. In other words, it is considered that when firing is performed at the same firing temperature in the case of not containing the Al-based oxide and the case of containing the Al-based oxide, the sintering can be promoted in the case of containing the Al-based oxide compared with the case of not containing the Al-based oxide. Then, it is considered that as the sinterability of the dielectric composition is improved, the strength of the dielectric composition is improved and dielectric characteristics such as the specific dielectric constant are improved.

Stress may be applied to the multilayer ceramic capacitor 1 mounted on a circuit board due to deformation such as bending of the circuit board. Therefore, the dielectric composition is required to have a high mechanical strength.

In contrast, the multilayer ceramic capacitor 1 of the embodiment can exhibit a high strength and a high specific dielectric constant by including the dielectric layer 2 containing the above dielectric composition.

2. Second Embodiment

The multilayer ceramic capacitor according to this embodiment is the same as the multilayer ceramic capacitor according to the first embodiment except for the following points.

Figure 3:
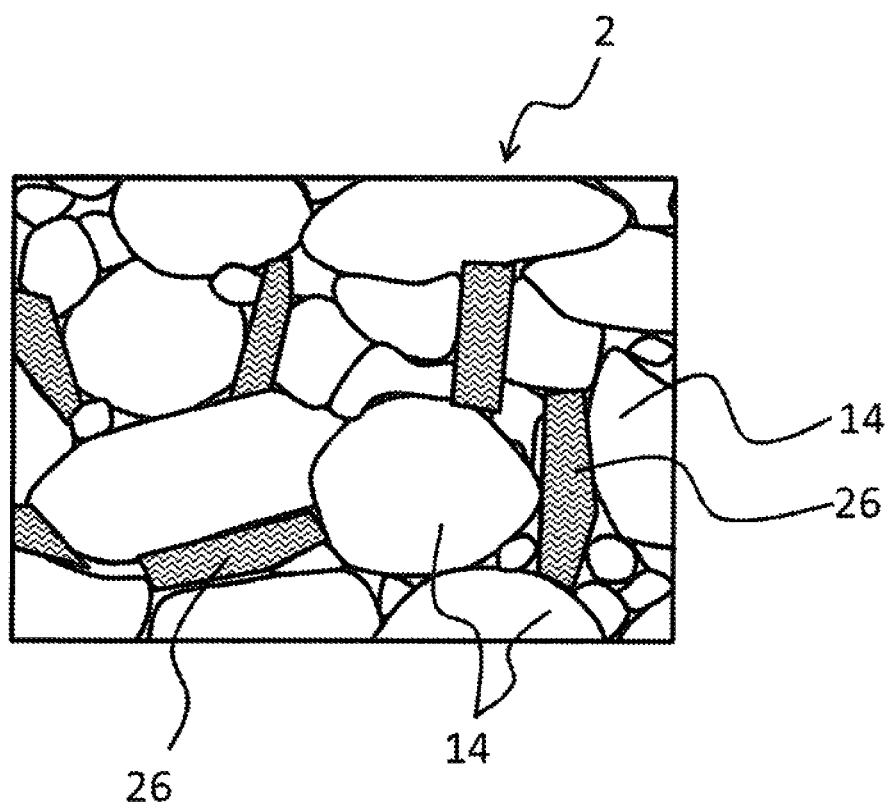
FIG. 3 is a cross-sectional view of a dielectric composition of Sample No. 49.

As shown in FIG. 3, the dielectric composition constituting the dielectric layer 2 according to the embodiment contains a Si-based segregation phase 26 among the composite oxide particles 14. The Si-based segregation phase 26 contains a Si-based oxide containing niobium (Nb), alkaline earth metal, and silicon (Si). The Si-based segregation phase 26 may contain an element in addition to the above elements.

The dielectric composition according to the embodiment can exhibit a high strength and a high specific dielectric constant by containing the Si-based segregation phase 26 among the composite oxide particles 14. The reason why this effect is obtained is considered to be that the Si-based oxide functions as a good sintering aid for the composite oxide particles.

In addition, there is a tendency that the specific dielectric constant is required to be high near room temperature, and the dielectric composition according to the embodiment can improve the specific dielectric constant near room temperature.

In the embodiment, whether the dielectric composition constituting the dielectric layer 2 contains the Si-based segregation phase 26 among the composite oxide particles 14 can be judged by the same method as in the first embodiment. Specifically, the different phase of the cross section of the dielectric composition is identified by the same method as in the first embodiment. Next, for the identified different phase, the amounts of silicon (Si), alkaline earth metal, and niobium (Nb) are measured by EDS analysis.

In the embodiment, preferably, when the total amount of silicon (Si), alkaline earth metal, and niobium (Nb) is set as 100 parts by mole, a Si-based oxide is formed at a location where silicon (Si) is 20.0 to 30.8 parts by mole, alkaline earth metal is 17.6 to 37.5 parts by mole, and niobium (Nb) is 37.5 to 58.8 parts by mole, and this location is judged as the Si-based segregation phase 26.

In the embodiment, the area ratio of the Si-based segregation phase 26 is represented by "a formula of (area of Si-based segregation phase 26/area of composite oxide particles 14)×100 [%]".

In the embodiment, the area ratio of the Si-based segregation phase 26 is preferably 0.1% to 10%, and more preferably 1% to 10%. Thereby, the dielectric composition of the embodiment can exhibit a higher strength and a higher specific dielectric constant.

In the embodiment, the circle equivalent diameter ratio of the Si-based segregation phase 26 is represented by "a formula of (circle equivalent diameter of Si-based segregation phase 26/circle equivalent diameter of composite oxide particles 14)×100 [%]".

In the embodiment, the circle equivalent diameter ratio of the Si-based segregation phase 26 is preferably 0.1% to 10%, and more preferably 0.2% to 5%. Thereby, the dielectric composition of the embodiment can exhibit a higher strength and a higher specific dielectric constant.

In the dielectric composition of the embodiment, the crystal system of the Si-based oxide is preferably hexagonal. Thereby, the dielectric composition of the embodiment can exhibit a higher strength and a higher specific dielectric constant.

In the embodiment, the aspect ratio of the cross section of the Si-based segregation phase 26 is represented by a formula of "long diameter (L)/short diameter (S)".

In the embodiment, the aspect ratio is preferably 2.0 or more. Thereby, the dielectric composition of the embodiment can exhibit a higher strength and a higher specific dielectric constant.

The alkaline earth metal constituting the Si-based oxide in the embodiment is not particularly limited and is preferably barium (Ba) and strontium (Sr). One type of alkaline earth metal may be used, or two types of alkaline earth metals may be used concurrently.

When the amount of niobium (Nb) in the Si-based oxide in the embodiment is set as 6 parts by mole, the amount of silicon (Si) is preferably 2.4 to 4 parts by mole. In addition, when the amount of niobium (Nb) in the Si-based oxide in the embodiment is set as 6 parts by mole, the amount of alkaline earth metal is preferably 1.8 to 6 parts by mole.

By the mole ratio of silicon (Si) and the mole ratio of alkaline earth metal in the Si-based oxide being within the above ranges, the dielectric composition according to the embodiment can exhibit a higher strength and a higher specific dielectric constant.

In the embodiment, similar to the first embodiment, it is considered that the sintering of the dielectric composition during firing is promoted by containing the Si-based oxide or the raw material of the Si-based oxide in the raw material of the dielectric composition. Accordingly, it is possible to reduce the firing temperature necessary for obtaining the sinterability to the extent that sufficient characteristics can be exhibited. In other words, it is considered that when firing is performed at the same firing temperature in the case of not containing the Si-based oxide and the case of containing the Si-based oxide, the sintering can be promoted in the case of containing the Si-based oxide compared with the case of not containing the Si-based oxide. Then, it is considered that as the sinterability of the dielectric composition is improved, the strength of the dielectric composition is improved and dielectric characteristics such as the specific dielectric constant are improved.

3. Variation Example

In the above embodiments, the case in which the electronic component according to the present invention is a multilayer ceramic capacitor has been described, but the electronic component according to the present invention is not limited to the multilayer ceramic capacitor, and may be any electronic component having the above dielectric composition.

For example, the electronic component may be a single-plate-type ceramic capacitor in which a pair of electrodes is formed on the above dielectric composition.

In addition, the dielectric composition may contain both the Al-based segregation phase and the Si-based segregation phase.

The embodiments of the present invention have been described above, but the present invention is not limited to the above embodiment and may be modified in various ways within the scope of the present invention.

EXAMPLE

Hereinafter, the present invention is described in more detail with reference to examples and comparative examples. However, the present invention is not limited to the following examples.

(Experiment 1)

Powders of barium carbonate ($BaCO_3$), strontium carbonate ($SrCO_3$), and niobium oxide ($Nb_2O_5$) were prepared as the starting raw materials of the composite oxide particles contained in the dielectric composition. The prepared starting raw materials were weighed so that x and y are as shown in Table 1 in the composite oxide particles contained in the dielectric composition after firing and having the composition formula represented by $(Sr_xBa_{1-x})_yNb_2O_{5+y}$.

Next, the weighed powders were wet-mixed for 16 hours by a ball mill using ion-exchanged water serving as a dispersion medium, and the mixture was dried to obtain a mixed raw material powder. Thereafter, the obtained mixed raw material powder was heat-treated in the atmosphere under the conditions of a retention temperature of 900° C. and a retention time of 2 hours, and calcined powder of the composite oxide particles was obtained.

In addition, as the raw material of the Al-based oxide, powder of niobium (Nb) oxide and powder of aluminum (Al) oxide were weighed so that the chemical formula of the Al-based oxide contained in the dielectric composition after firing is as shown in Table 1 and the addition amount of the Al-based oxide is as shown in Table 1.

Besides, the addition amount shown in Table 1 indicates an addition amount of the Al-based oxide when the composite oxide particles are set as 100% by mass.

The powder of Niobium (Nb) oxide and the powder of aluminum (Al) oxide were subjected to heat treatment in the atmosphere under the conditions of a retention temperature of 900° C. and a retention time of 2 hours, and calcined powder of the Al-based oxide was obtained.

The obtained calcined powder of the composite oxide particles and the obtained calcined powder of the Al-based oxide were wet-pulverized for 16 hours by a ball mill using ion-exchanged water serving as a dispersion medium, and the pulverized product was dried.

10% by mass of an aqueous solution containing 6% by mass of a polyvinyl alcohol resin serving as a binder was added to 100% by mass of the pulverized product to perform granulation, and granulated powder was obtained.

The obtained granulated powder was put into a press mold of φ12 mm, subjected to temporary press molding at a pressure of 0.6 ton/cm², and further subjected to formal press molding at a pressure of 1.2 ton/cm², to thereby obtain a disc-shaped green molded body.

The obtained green molded body was fired in a reducing atmosphere and further subjected to annealing treatment, and a sintered body (dielectric composition) fired in the reducing atmosphere was obtained. As the firing conditions, the heating rate was set to 200° C./h, the retention temperature was set at 1250° C., and the retention time was set to 2 hours. The atmospheric gas was a mixed gas of nitrogen and hydrogen (hydrogen concentration 3%) humidified to a dew point of 20° C. In addition, as the annealing treatment conditions, the retention temperature was set at 1050° C. and the retention time was set to 2 hours. The atmospheric gas was a nitrogen gas humidified to a dew point of 20° C.

A disc-shaped ceramic capacitor sample was obtained by applying an In—Ga alloy to both main surfaces of the obtained sintered body to form a pair of electrodes.

For a 5 μm×5 μm field of the cross section of the obtained dielectric composition, the different phase was identified by STEM, and EDS was used to measure the amounts of aluminum (Al), strontium (Sr), barium (Ba), and niobium (Nb).

When the total amount of aluminum (Al), strontium (Sr), barium (Ba), and niobium (Nb) is set as 100 parts by mole, the different phase in which aluminum (Al) is 40 to 69 parts by mole and niobium (Nb) is 29 to 57 parts by mole was judged as the Al segregation phase. The results are shown in Table 1.

In addition, the results of the mole ratio of aluminum (Al) represented by Al/(Al+Nb) are also shown in Table 1.

The density of the capacitor sample was measured as follows. The diameter of the disc-shaped capacitor sample after firing was measured at three locations to obtain a diameter R. Next, the thickness of the disc-shaped capacitor sample was measured at three locations to obtain a thickness h. The obtained R and h were used to calculate a volume V ($=\frac{1}{4}\cdot\pi\cdot R^2\cdot h$) of the disc-shaped capacitor sample. Here, π indicates the circular constant. Subsequently, the density of the disc-shaped capacitor sample was obtained by measuring a mass m of the disc-shaped capacitor sample and calculating m/V. The average values of the density results evaluated for three samples are shown in Table 1.

In addition, the mechanical strength of the dielectric composition was measured as follows. The obtained granulated powder was put into a press mold of 5×53 mm, subjected to temporary press molding at a pressure of 0.6 ton/cm$^2$, and further subjected to formal press molding at a pressure of 1.2 ton/cm$^2$ to obtain a green molded body. The obtained green molded body was fired in air, and a prismatic sintered body having a rectangular cross section was obtained. As the firing conditions, the heating rate was set to 200° C./h, the retention temperature was set at 1300° C., and the retention time was set to 2 hours.

The obtained sintered body was machined and chamfered so that the total length is 36 mm or more and less than 45 mm, the width is 4.0±0.1 mm, and the thickness is 3.0±0.1 mm, and the obtained sintered body was used as a test specimen. A three-point bending test was performed on 10 specimens obtained for each sample based on a test method specified in JIS R 1601. In the example, the sample in which an average value of three-point bending strength is 40 MPa or more was set as A, the sample of 30 MPa or more and 40 MPa or less was set as B, the sample of 20 MPa or more and less than 30 MPa was set as C, and the sample of less than 20 MPa was shown as NG. The results are shown in Table 1.

For the capacitor sample, a digital resistance meter (R8340 manufactured by ADVANTEST) was used to measure the insulation resistance at a reference temperature (25° C.). The resistivity was calculated from the obtained insulation resistance, the effective electrode area, and the thickness of the dielectric layer. Higher resistivity is preferable. The results are shown in Table 1.

A signal having a frequency of 1 MHz and an input signal level (measurement voltage) of 1 Vrms was input by a digital LCR meter (4284A manufactured by YHP) at room temperature (20° C.), and the capacitance was measured. Then, the specific dielectric constant (no unit) was calculated based on the thickness of the dielectric layer, the effective electrode area, and the capacitance obtained by the measurement. Higher specific dielectric constant is preferable. The results are shown in Table 1.

Figure 4:
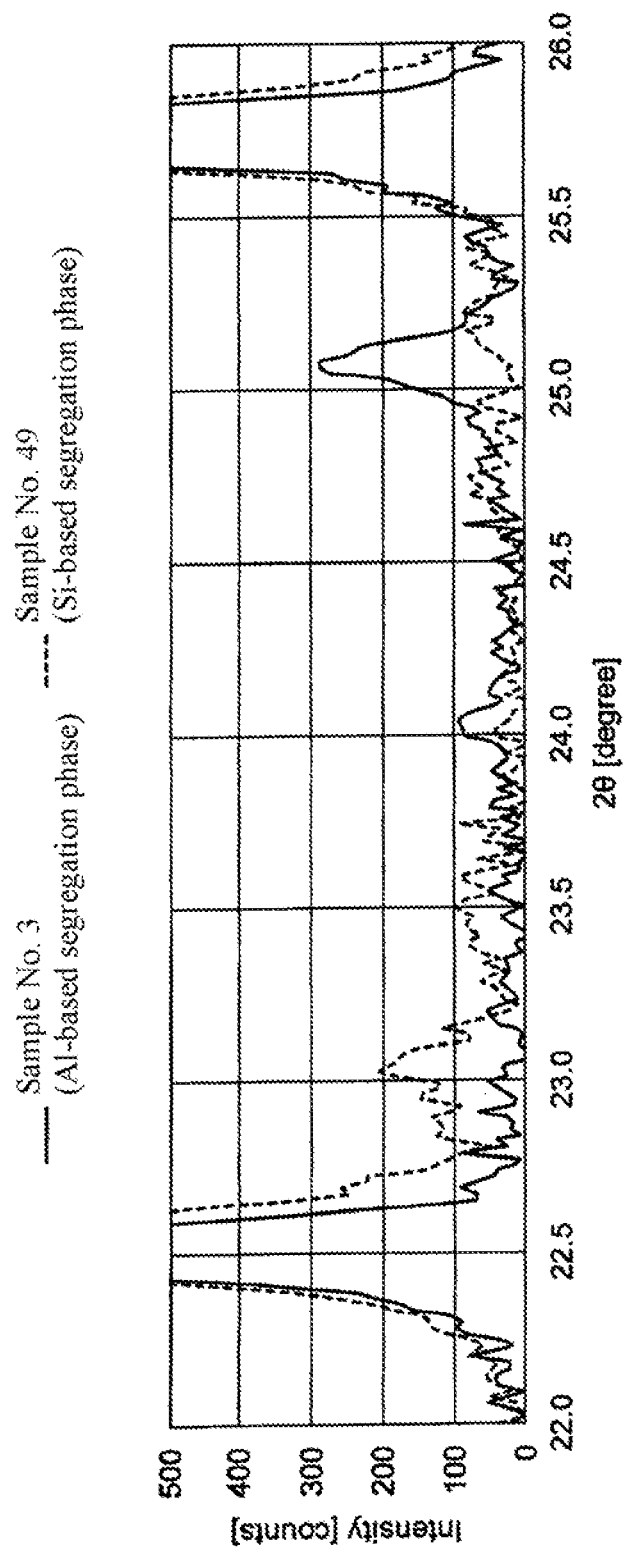
FIG. 4 shows XRD patterns of Sample No. 3 and Sample No. 49.

For Sample No. 3, the obtained sintered body was pulverized in an agate mortar and subjected to X-ray diffraction measurement by the following method. The obtained XRD pattern is shown in FIG. 4.

X-ray (Cu-Kα ray) diffraction device: X'Pert Pro manufactured by PANalytical
2θ/θ=16 to 40 deg
X-ray generation condition: 45 kV-40 mA
Scan width: 0.017°
Scan rate: 0.10°/s
X-ray detection conditions:
Incident side optical system
Ni filter: 10 μm
Solar slit: 0.04 rad
Divergence slit: ½°
Mask: 10 mm
Anti-scatter slit: 1°
Receiving side optical system
Anti-scatter slit: 5.5 mm
Solar slit: 0.04 rad
Ni filter: 20 μm For Sample No. 3, the crystal system of the Al-based oxide contained in the obtained dielectric composition was analyzed by acquiring data using an X-ray structure analyzer and matching the data with the database of existing substances. As a result, confirmation could be made that the crystal system is monoclinic.

TABLE 1

| Sample number | Al-based oxide Type | A | Mole ratio of aluminum | Addition amount [mass %] | Whether Al-based segregation phase is present | Density [g/cm$^3$] | Three-point bending strength | Specific dielectric constant | Resistivity [Ω·m] |
|---|---|---|---|---|---|---|---|---|---|
| 1 | None | — | — | — | No | 3.69 | C | 340 | 6.8E+03 |
| 1a | (Nb$_{(8-3a)/5}$Al$_a$)O$_4$ | 0.26 | 0.15 | 7.0 | Yes | 3.98 | B | 370 | 5.9E+03 |
| 2 | (Nb$_{(8-3a)/5}$Al$_a$)O$_4$ | 0.83 | 0.43 | 7.0 | Yes | 4.95 | A | 505 | 6.4E+05 |
| 3 | (Nb$_{(8-3a)/5}$Al$_a$)O$_4$ | 0.88 | 0.45 | 7.0 | Yes | 4.83 | A | 488 | 2.2E+05 |
| 4 | (Nb$_{(8-3a)/5}$Al$_a$)O$_4$ | 1.00 | 0.50 | 7.0 | Yes | 4.72 | A | 467 | 1.4E+05 |
| 5 | (Nb$_{(8-3a)/5}$Al$_a$)O$_4$ | 1.13 | 0.55 | 7.0 | Yes | 4.41 | A | 424 | 1.2E+05 |
| 6 | (Nb$_{(8-3a)/5}$Al$_a$)O$_4$ | 1.41 | 0.65 | 7.0 | Yes | 4.38 | A | 414 | 5.0E+04 |

TABLE 1-continued

| Sample number | Al-based oxide Type | A | Mole ratio of aluminum | Addition amount [mass %] | Whether Al-based segregation phase is present | Density [g/cm³] | Three-point bending strength | Specific dielectric constant | Resistivity [Ω · m] |
|---|---|---|---|---|---|---|---|---|---|
| 7 | $(Nb_{(8-3a)/5}Al_a)O_4$ | 1.52 | 0.69 | 7.0 | Yes | 4.31 | A | 408 | 1.1E+05 |
| 8 | $(Nb_{(8-3a)/5}Al_a)O_4$ | 2.25 | 0.90 | 7.0 | Yes | 3.98 | B | 380 | 7.0E+03 |

Composite oxide particles = $(Sr_{0.4}Ba_{0.6})_{0.9}Nb_2O_{5.9}$

From Table 1, confirmation could be made that the strength and the specific dielectric constant are higher in the case of having the Al-based segregation phase (Sample No. 1a and Sample Nos. 2-8) than in the case of not having the Al-based segregation phase (Sample No. 1).

From FIG. 4, a weak peak can be confirmed near 25 degrees in Sample No. 3. It is considered that this is due to the Al-based oxide.

(Experiment 2)

Except that the area ratio of the Al-based segregation phase was changed by changing the addition amount of the Al-based oxide, a dielectric composition was obtained and disc-shaped ceramic capacitor samples were obtained in the same manner as in Sample No. 3 of Experiment 1. The measurement results of the area ratio of the Al-based segregation phase are shown in Table 2. In addition, the density, the three-point bending strength, the specific dielectric constant, and the resistivity were obtained in the same manner as in Experiment 1. The results are shown in Table 2.

TABLE 2

| Sample number | Addition amount of Al-based oxide [mass %] | Area ratio of Al-based segregation phase | density [g/cm³] | Three-point bending strength | Specific dielectric constant | Resistivity [Ω · m] |
|---|---|---|---|---|---|---|
| 3 | 7.0 | 5% | 4.83 | A | 488 | 2.2E+05 |
| 11 | 14 | 10% | 4.82 | A | 490 | 2.9E+05 |
| 12 | 1.4 | 1% | 4.67 | A | 472 | 8.8E+04 |
| 13 | 0.70 | 0.5% | 4.43 | A | 440 | 4.5E+04 |
| 14 | 0.14 | 0.1% | 4.32 | A | 421 | 2.4E+04 |
| 15 | 17 | 12% | 4.70 | B | 478 | 1.4E+05 |
| 16 | 0.070 | 0.05% | 3.94 | B | 360 | 6.1E+03 |

Composite oxide particles = $(Sr_{0.4}Ba_{0.6})_{0.9}Nb_2O_{5.9}$
Al-based oxide = $(Nb_{(8-3a)/5}Al_a)O_4$, a = 0.88
Mole ratio of Al = 0.45

From Table 2, confirmation could be made that the strength is higher in the case that the area ratio of the Al-based segregation phase is 0.1% to 10% (Sample No. 3 and 11 to 14) than in the case that the area ratio of the Al-segregation phase is 12% (Sample No. 15) or 0.05% (Sample No. 16).

(Experiment 3)

Except that x and y in the composition formula of the composite oxide particles were changed as shown in Table 3, a disc-shaped ceramic capacitor sample was obtained in the same manner as in Sample No. 3 of Experiment 1. In addition, the density, the three-point bending strength, the specific dielectric constant, and the resistivity were measured in the same manner as in Experiment 1. The results are shown in Table 3.

TABLE 3

| Sample number | Whether Al-based segregation phase is present | Composite oxide particles $(Sr_xBa_{1-x})_yNb_2O_{5+y}$ X | Y | Density [g/cm³] | Three-point bending strength | Specific dielectric constant | Resistivity [Ω · m] |
|---|---|---|---|---|---|---|---|
| 3 | Yes | 0.4 | 0.9 | 4.83 | A | 488 | 2.2E+05 |
| 31 | Yes | 0.2 | 0.9 | 5.04 | A | 601 | 1.5E+05 |

TABLE 3-continued

| Sample number | Whether Al-based segregation phase is present | Composite oxide particles $(Sr_xBa_{1-x})_yNb_2O_{5+y}$ | | Density [g/cm³] | Three-point bending strength | Specific dielectric constant | Resistivity [Ω · m] |
|---|---|---|---|---|---|---|---|
| | | X | Y | | | | |
| 32 | Yes | 0.6 | 0.9 | 5.12 | A | 723 | 7.0E+04 |
| 33 | Yes | 0.4 | 0.8 | 4.73 | A | 470 | 1.3E+06 |
| 34 | Yes | 0.4 | 1.2 | 5.20 | A | 992 | 1.2E+01 |

Al-based oxide = $(Nb_{(8-3a)/5}Al_a)O_4$, a = 0.88
Mole ratio of Al = 0.45

From Table 3, confirmation could be made that a high strength is exhibited in each case when x and y in the composition formula of the composite oxide particles are changed as shown in Table 3.

(Experiment 4)

Except that the Si-based oxide was used instead of the Al-based oxide, disc-shaped ceramic capacitor samples were obtained and the density, the three-point bending strength, the specific dielectric constant, and the resistivity were measured in the same manner as in Experiment 1. The results are shown in Table 4. In addition, the X-ray diffraction of Sample No. 49 was performed in the same manner as in Sample No. 3 of Experiment 1. The results are shown in FIG. 4.

Besides, as the raw material of the Si-based oxide, powder of niobium (Nb) oxide, powder of barium (Ba) oxide, powder of strontium (Sr) oxide, and powder of silicon (Si) oxide were weighed so that the element mole ratio of the Si-based oxide contained in the dielectric composition after firing is as shown in Table 4 and the addition amount of the Si-based oxide is as shown in Table 4.

The addition amount shown in Table 4 indicates the addition amount of the Si-based oxide when the total amount of the composite oxide particles and the Si-based oxide is set as 100% by mass.

The presence or absence of the Si-based segregation phase and the element mole ratio of the Si-based oxide were measured by the following method.

For a 5 μm×5 μm field of the cross section of the obtained dielectric composition, the different phase was identified by STEM, and EDS was used to measure the amounts of silicon (Si), strontium (Sr), barium (Ba), and niobium (Nb).

When the total amount of silicon (Si), strontium (Sr), barium (Ba), and niobium (Nb) is set as 100 parts by mole, the different phase in which silicon (Si) is 20.0 to 30.8 parts by mole and niobium (Nb) is 37.5 to 58.8 parts by mole was judged as the Si segregation phase. The results are shown in Table 4.

For Sample No. 49, the crystal system of the Si-based oxide contained in the obtained dielectric composition was analyzed by acquiring data using an X-ray structure analyzer and matching the data with the database of existing substances. As a result, confirmation could be made that the crystal system is hexagonal.

TABLE 4

| Sample number | Si-based oxide | | | | | | Whether Si-based segregation phase is present | Density [g/cm³] | Three-point bending strength | Specific dielectric constant | Resistivity [Ω · m] |
|---|---|---|---|---|---|---|---|---|---|---|---|
| | Element mole ratio | | | | | Addition amount [mass %] | | | | | |
| | Ba + Sr | Ba | Sr | Nb | Si | | | | | | |
| 1 | — | — | — | — | — | — | No | 3.69 | C | 340 | 9.2E+03 |
| 41 | 3 | 1.8 | 1.2 | 6 | 4 | 7.0 | Yes | 4.41 | A | 426 | 1.2E+05 |
| 42 | 3 | 0.3 | 2.7 | 6 | 4 | 7.0 | Yes | 4.32 | A | 424 | 6.9E+04 |
| 43 | 3 | 2.7 | 0.3 | 6 | 4 | 7.0 | Yes | 4.31 | A | 410 | 3.0E+04 |
| 44 | 2.25 | 1.4 | 0.9 | 6 | 3 | 7.0 | Yes | 4.6 | A | 457 | 8.0E+04 |
| 45 | 1.8 | 1.1 | 0.7 | 6 | 2.4 | 7.0 | Yes | 4.78 | A | 469 | 5.9E+05 |
| 46 | 4 | 2.4 | 1.6 | 6 | 4 | 7.0 | Yes | 4.62 | A | 459 | 2.8E+05 |
| 47 | 5 | 3 | 2 | 6 | 4 | 7.0 | Yes | 4.82 | A | 495 | 8.8E+04 |
| 48 | 6 | 3.6 | 2.4 | 6 | 4 | 7.0 | Yes | 4.89 | A | 485 | 7.9E+05 |
| 49 | 3.6 | 2.2 | 1.4 | 6 | 2.4 | 7.0 | Yes | 4.78 | A | 478 | 2.1E+05 |
| 50 | 5 | 3 | 2 | 6 | 2 | 7.0 | Yes | 3.97 | B | 370 | 6.8E+03 |
| 51 | 5 | 3 | 2 | 6 | 5 | 7.0 | Yes | 3.88 | B | 380 | 6.5E+03 |
| 52 | 1 | 0.6 | 0.4 | 6 | 4 | 7.0 | Yes | 3.89 | B | 388 | 5.8E+03 |
| 53 | 7 | 4.2 | 2.8 | 6 | 5 | 7.0 | Yes | 3.93 | B | 381 | 5.6E+03 |

Composite oxide particles = $(Sr_{0.4}Ba_{0.6})_{0.9}Nb_2O_{5.9}$

From Table 4, confirmation could be made that the strength and the specific dielectric constant are higher in the case of having the Si-based segregation phase (Sample No. 41 to 53) than in the case of not having the Si-based segregation phase (Sample No. 1).

From FIG. 4, a weak peak can be confirmed near 23 degrees in Sample No. 49. It is considered that this is due to the Si-based oxide.

(Experiment 5)

Except that the area ratio of the Si-based segregation phase was changed by changing the addition amount of the Si-based oxide, dielectric composition was obtained and disc-shaped ceramic capacitor samples were obtained in the same manner as in Sample No. 49 of Experiment 4. The measurement results of the area ratio of the Si-based segregation phase are shown in Table 5. In addition, the density, the three-point bending strength, the specific dielectric constant, and the resistivity were obtained in the same manner as in Experiment 1. The results are shown in Table 5.

TABLE 5

| Sample number | Addition amount of Si-based oxide [mass %] | Area ratio of Si-based segregation phase | Density [g/cm$^3$] | Three-point bending strength | Specific dielectric constant | Resistivity [Ω · m] |
|---|---|---|---|---|---|---|
| 49 | 7.0 | 5% | 4.78 | A | 478 | 9.6E+04 |
| 61 | 14 | 10% | 4.81 | A | 485 | 9.7E+04 |
| 62 | 1.4 | 1% | 4.72 | A | 471 | 1.2E+05 |
| 63 | 0.70 | 0.5% | 4.41 | A | 419 | 3.8E+04 |
| 64 | 0.14 | 0.1% | 4.33 | A | 422 | 6.4E+04 |
| 65 | 17 | 12% | 4.71 | B | 476 | 5.8E+04 |
| 66 | 0.07 | 0.05% | 3.93 | B | 370 | 5.3E+03 |

Composite oxide particles = $(Sr_{0.4}Ba_{0.6})_{0.9}Nb_2O_{5.9}$
Element mole ratio of Si-based oxide: Ba + Sr = 6, Ba = 3.6, Sr = 2.4, Nb = 10, Si = 4

From Table 5, confirmation could be made that the strength is higher in the case that the area ratio of the Si-based segregation phase is 0.1% to 10% (Sample No. 49 and 61 to 64) than in the case that the area ratio of the Si-based segregation phase is 12% (Sample No. 65) or 0.05% (Sample No. 66).

(Experiment 6)

Except that the aspect ratio of the Si-based oxide was changed by changing the pulverization conditions of the calcined powder of the Si-based oxide, disc-shaped ceramic capacitor samples were obtained in the same manner as in Sample No. 49 of Experiment 4. The measurement results of the aspect ratio are shown in Table 6.

In addition, the density, the three-point bending strength, the specific dielectric constant, and the resistivity were measured in the same manner as in Experiment 1. The results are shown in Table 6.

TABLE 6

| Sample number | Whether Si-based segregation phase is present | Aspect ratio of Si-based segregation phase | Density [g/cm$^3$] | Three-point bending strength | Specific dielectric constant | Resistivity [Ω · m] |
|---|---|---|---|---|---|---|
| 49 | Yes | 4 | 4.78 | A | 478 | 2.1E+05 |
| 71 | Yes | 6 | 4.8 | A | 483 | 2.6E+05 |
| 72 | Yes | 2 | 4.7 | A | 467 | 1.7E+05 |
| 73 | Yes | 1.5 | 4.38 | B | 412 | 1.3E+05 |
| 74 | Yes | 1.2 | 4.32 | B | 410 | 2.0E+04 |

Composite oxide particles = $(Sr_{0.4}Ba_{0.6})_{0.9}Nb_2O_{5.9}$
Element mole ratio of Si-based oxide: Ba + Sr = 6, Ba = 3.6, Sr = 2.4, Nb = 10, Si = 4

From Table 6, confirmation could be made that the strength is higher in the case that the aspect ratio is 2 or more (Sample No. 49, 71 and 72) than in the case that the aspect ratio is 1.5 (Sample No. 73) and the case that the aspect ratio is 1.2 (Sample No. 74).

(Experiment 7)

Except that x and y in the composition formula of the composite oxide particles were changed as shown in Table 7, disc-shaped ceramic capacitor samples were obtained in the same manner as in Sample No. 49 of Experiment 4. In addition, the density, the three-point bending strength, the specific dielectric constant, and the resistivity were measured in the same manner as in Experiment 1. The results are shown in Table 7.

that there is no Al-based segregation phase or Si-based segregation phase, and lithium oxide ($Li_2O$) (Sample No. 101), boron oxide ($B_2O_3$) (Sample No. 102) or vanadium oxide ($V_2O_5$) (Sample No. 103) was added.

Besides, the reason why the above results are obtained is considered to be that the Al-based oxide (Sample No. 3) or the Si-based oxide (Sample No. 49) is a sintering aid suitable for the above composite oxide particles compared with the additives of Sample No. 101 to 103. It is considered that this is because wetting of the Al-based oxide or the Si-based oxide is excellent to the composite oxide particles, the Al-based oxide or the Si-based oxide is not prone to dis-

TABLE 7

| Sample number | Whether Si-based segregation phase is present | Composition of composite oxide particles $(Sr_xBa_{1-x})_yNb_2O_{5+y}$ | | Density [g/cm³] | Three-point bending strength | Specific dielectric constant | Resistivity [Ω · m] |
|---|---|---|---|---|---|---|---|
| | | X | y | | | | |
| 49 | Yes | 0.4 | 0.9 | 4.78 | A | 478 | 2.1E+05 |
| 91 | Yes | 0.2 | 0.9 | 5.02 | A | 612 | 1.2E+05 |
| 92 | Yes | 0.6 | 0.9 | 5.15 | A | 708 | 5.5E+04 |
| 93 | Yes | 0.4 | 0.8 | 4.72 | A | 482 | 1.1E+06 |
| 94 | Yes | 0.4 | 1.2 | 5.18 | A | 980 | 1.1E+01 |

Element mole ratio of Si-based oxide: Ba + Sr = 6, Ba = 3.6, Sr = 2.4, Nb = 10, Si = 4

From Table 7, confirmation could be made that a high strength is exhibited in each case when x and y in the composition formula of the composite oxide particles are changed as shown in Table 7.

(Experiment 8)

Except that the additives were changed to the Al-based oxide as shown in Table 8, disc-shaped ceramic capacitor samples were obtained and the density, the three-point bending strength, the specific dielectric constant, and the resistance were measured in the same manner as in Experiment 1. The results are shown in Table 8.

The addition amount shown in Table 8 indicates the addition amount of each additive when the composite oxide particles are set as 100% by mass.

solves in the composite oxide particles, and the composite oxide particles dissolve easily in the Al-based oxide or the Si-based oxide.

In addition, the reason for the low strength when vanadium oxide ($V_2O_5$) was added (Sample No. 103) is considered to be that the particles became coarse.

In addition, confirmation could be made that when Sample No. 3 having the Al-based segregation phase and Sample No. 49 having the Si-based segregation phase are compared, Sample No. 3 having the Al-based segregation phase has a higher strength and a higher specific dielectric constant. It is considered that this is because the Al-based oxide has an action of making it difficult to form pores in the dielectric composition compared with the Si-based oxide.

TABLE 8

| Sample number | Whether segregation phase is present | Additive | Addition amount [mass %] | Density [g/cm³] | Three-point bending strength | Specific dielectric constant | Resistivity [Ω · m] |
|---|---|---|---|---|---|---|---|
| 3 | Al-based segregation phase | Al-based oxide | 7.0 | 4.83 | A | 488 | 2.2E+05 |
| 49 | Si-based segregation phase | Si-based oxide | 7.0 | 4.78 | A | 478 | 2.1E+05 |
| 101 | No Al-based segregation phase or Si-based segregation phase | $Li_2O$ | 7 | 3.95 | NG | 388 | 3.0E+03 |
| 102 | No Al-based segregation phase or Si-based segregation phase | $B_2O_3$ | 7 | 3.98 | NG | 392 | 9.2E+03 |
| 103 | No Al-based segregation phase or Si-based segregation phase | $V_2O_5$ | 7 | 3.89 | NG | 380 | 4.3E+03 |

Composite oxide particles = $(Sr_{0.4}Ba_{0.6})_{0.9}Nb_2O_{5.9}$
Al-based oxide = $(Nb_{(8-3a)/5}Al_a)O_4$, a = 0.88
Element mole ratio of Si-based oxide: Ba + Sr = 6, Ba = 3.6, Sr = 2.4, Nb = 10, Si = 4

From Table 8, confirmation could be made that the strength is higher in the case of having the Al-based segregation phase (Sample No. 3) or the case of having the Si-based segregation phase (Sample No. 49) than in the case

What is claimed is:
1. A dielectric composition, comprising: composite oxide particles having a composition formula represented by $(Sr_xBa_{1-x})_yNb_2O_{5+y}$ and an Al-based segregation phase, wherein the Al-based segregation phase comprises an Al-based oxide having niobium, aluminum, and oxygen, x in the composition formula is 0.2 to 0.7, and y in the composition formula is 0.8 to 1.2.

2. The dielectric composition according to claim 1, wherein the mole ratio of aluminum represented by a formula of Al/(Al+Nb) is 0.43 to 0.69 in the Al-based oxide.

3. The dielectric composition according to claim 1, wherein a crystal system of the Al-based oxide is monoclinic.

4. The dielectric composition according to claim 1, wherein an area ratio of the Al-based segregation phase represented by a formula of (area of Al-based segregation phase/area of composite oxide particles)×100 [%] is 0.1% to 10%.

5. An electronic component, comprising a dielectric layer containing the dielectric composition according to claim 1.

6. The dielectric composition according to claim 1, wherein x in the composition formula is 0.2 to 0.6.

7. The dielectric composition according to claim 1, wherein x in the composition formula is 0.2 to 0.5.

8. The dielectric composition according to claim 2, wherein the mole ratio of aluminum represented by a formula of Al/(Al+Nb) is 0.43 to 0.50 in the Al-based oxide.

9. The dielectric composition according to claim 4, wherein the area ratio of the Al-based segregation phase represented by a formula of (area of Al-based segregation phase/area of composite oxide particles)×100 [%] is 1% to 10%.

10. The dielectric composition according to claim 1, wherein the Al-based oxide has the formula $(Nb_{(8-3a)/5}Al_a)O_4$, wherein "a" is 0.83 to 1.52.

11. The dielectric composition according to claim 10, wherein "a" is 0.83 to 1.00.

* * * * *